US00RE37881E

(19) United States
(12) Reissued Patent
Haines

(10) Patent Number: US RE37,881 E
(45) Date of Reissued Patent: Oct. 15, 2002

(54) SINGLE DECK DUAL TAPE PATH VCR SYSTEM

(75) Inventor: Curtis D. Haines, Houston, TX (US)

(73) Assignee: ReplayTV, Mountain View, CA (US)

( * ) Notice: This patent is subject to a terminal disclaimer.

(21) Appl. No.: 09/721,789

(22) Filed: Nov. 22, 2000

Related U.S. Patent Documents

Reissue of:
(64) Patent No.: 5,841,940
Issued: Nov. 24, 1998
Appl. No.: 08/577,833
Filed: Dec. 22, 1995

U.S. Applications:
(

(63) Continuation of application No. 08/162,500, filed on Dec. 3, 1993, now Pat. No. 5,479,302.

(51) Int. Cl.[7] ..... H04N 5/92; H04N 5/761; G11B 15/18

(52) U.S. Cl. ..... 386/92; 386/46; 360/69

(58) Field of Search ..... 386/92, 46, 81, 386/83, 95, 52, 55, 4, 1; 360/32, 15, 13, 69; 369/83, 84; H04N 5/92, 5/761

(56) References Cited

U.S. PATENT DOCUMENTS 3,041,417 A * 6/1962 Stroud et al. ..... 360/75 X
3,360,613 A * 12/1967 Cooper ..... 360/13
3,942,190 A * 3/1976 Detwiler ..... 360/63
4,673,992 A * 6/1987 Kincheloe et al. ..... 360/15
4,768,110 A * 8/1988 Dunlap et al. ..... 360/33.1
4,772,969 A * 9/1988 Grant ..... 360/85
4,851,940 A * 7/1989 Saito ..... 360/84 X
5,124,807 A * 6/1992 Dunlap et al. ..... 358/316
5,144,505 A * 9/1992 Kaneko et al. ..... 360/85
5,164,868 A * 11/1992 Mosher et al. ..... 360/85
5,187,589 A * 2/1993 Kono et al. ..... 386/92
5,247,405 A * 9/1993 Mitani ..... 360/84
5,442,390 A * 8/1995 Hooper et al. ..... 386/83
5,479,302 A * 12/1995 Haines ..... 360/69

FOREIGN PATENT DOCUMENTS

JP 62-184652 * 8/1987
JP 63-201953 * 8/1988

* cited by examiner

*Primary Examiner*—Robert Chevalier
(74) *Attorney, Agent, or Firm*—Blakely Sokoloff Taylor & Zafman

(57) ABSTRACT

A single deck dual tape path videocassette recorder/playback system enabling near simultaneous multiple functions with respect to a broadcast or cable communicated television signal. The system consists of standard elements which allow the receipt of a videocassette, the extracting and return of video tape from and to the videocassette, and the recording of a broadcast or cable communicated signal. The system also consists of two tape path assemblies and a videotape compartment consisting of a tape feed channel, a storage assembly, and a vacuum system. All elements are included within a single housing utilizing a common power supply, tuner, controls, and switching and control circuitry enabling simultaneous multiple functions using both tape paths, as well as additional function selections.

26 Claims, 5 Drawing Sheets

SINGLE DECK DUAL TAPE PATH VCR SYSTEM

Matter enclosed in heavy brackets [ ] appears in the original patent but forms no part of this reissue specification; matter printed in italics indicates the additions made by reissue.

This is a continuation of application Ser. No. 08/162,500, filed Dec. 3, 1993 now U.S. Pat. No. 5,479,302.

BACKGROUND OF THE INVENTION

1. Field of The Invention

This invention pertains to videocassette recorder ("VCR") systems, and more particularly to a single deck dual tape path videocassette recorder ("VCR") system that enables utilization of two tape paths for selective simultaneous functions. The present invention provides an integrated (single chassis, single videocassette platform, single tuner, single power supply, single control set,) dual tape path VCR system usable with a fully featured television set or with one or more components of a video system (e.g. antenna, monitor, tuner) enabling recording of an off-the-air broadcast or a cable transmitted signal to a videocassette tape from one tape path of the dual tape path VCR system, while allowing near simultaneous playback of the same videocassette tape from the other tape path to an associated television set or monitor.

2. Background Information

Video cassette recorders (VCR) are currently in widespread use and have several operable modes. In a record mode, the VCR is operable for recording a television broadcast on a suitable videocassette tape. In a playback mode, the VCR is operable for transmitting a previously recorded television broadcast to a conventional television receiver where it may be played back at the convenience of the viewer. The use of VCRs has therefore provided a means for viewers of television broadcasts to control their viewing habits by, for example, recording a television program at the time of its broadcast and then viewing the recorded program at some point in time after the broadcast.

Viewing a recorded program through the VCR enables the viewer to take full advantage of many useful VCR functions, including pause, fast-forward, and rewind. The pause function enables the user to stop the prerecorded program and resume viewing the program at any time. The viewer can rewind selective scenes and, more importantly, fast-forward through any unwanted commercials.

Several prior inventions have provided an additional degree of viewer convenience over and above the standard VCR functions described above. One such class of inventions automatically eliminates commercials from the recorded program. Most of these systems ("commercial killers") focus on the detection of certain signals, fades, or pauses in the original broadcast. As a result the recorded programs can be subsequently viewed on playback without commercials.

Other prior disclosures describe means for enabling the viewer to record two broadcast programs simultaneously through the use of dual recording decks. One advantage of such a system is that the viewer can record two programs at the same time while viewing a third program on a TV monitor. The circuitry for dual simultaneous recording and playing was disclosed in detail in U.S. Pat. No. 4,124,807, issued Jun. 23, 1992, to Dunlap et al. The Dunlap invention enables simultaneous recording/playback onto two separate video cassette tapes.

Setting or programming the recording time for a broadcast has also been made easy with the invention of user friendly on-screen commands and with the new "VCR Plus" codes. In many cases the user has only to input a few numbers to program the VCR. Many other inventions have also enhanced the overall quality and usefulness of the standard VCR.

Viewing recorded programs through a VCR enables the user to have near total viewing control of the transmitted program. Even though the viewing of recorded programs through a VCR has so many advantages, it still appears that most people watch the majority of their broadcast programs as the program is being transmitted. Why, for example, should a viewer sit through lengthy commercials when they can record a program and then subsequently watch the program on playback without commercials? One major reason, and the biggest disadvantage of prior art, is the time it takes to record and subsequently playback the desired program. There is no system described that allows the user to playback a program during recording. If the viewer wants to utilize the VCR playback functions while viewing a recorded program, the viewer must wait until the program has finished and the VCR has stopped recording. Only then can the recorded program be played back.

Applicant's invention addresses the need for a VCR system that provides the user with near simultaneous recording and playback of a broadcast or cable communicated television signal in addition to all of the standard controls of existing videotape systems.

SUMMARY OF THE INVENTION

The present invention is a videocassette recorder/playback system enabling near simultaneous recording and playback of a broadcast or cable communicated television signal. The system consists of standard elements which allow the receipt of a videocassette, the extracting and return of video tape from and to the videocassette, and the recording of a broadcast or cable communicated signal. The system, however, also consists of two tape path assemblies and a videotape compartment consisting of a tape feed channel, a storage assembly, and a vacuum system. The first tape path is for recording a television signal or for playing a recorded television signal and the second tape path is for playback of a recorded television signal from videotape extracted from the storage assembly or for recording a television signal on videotape extracted from the storage assembly.

The system of the present invention minimizes the time delay between recording a program and subsequently playing back the recorded program, allowing near simultaneous playback of a transmitting broadcast program. The unique simultaneous record/playback feature of the present invention allows the viewer to take full advantage of the many useful VCR functions without interrupting the recording of the program.

It is, therefore, an object of the present invention to overcome the prior-art drawbacks associated with standard recording and subsequent playback techniques and apparatus. The system of the present invention minimizes the time delay between recording a broadcast program and subsequent playback of the recorded program. The present invention allows the viewer near simultaneous record and playback of a broadcast program as it is transmitting.

It is also an object of Applicant's invention to provide a VCR system which, by incorporating dual tape paths and a storage assembly permits the simultaneous recording of two programs on a single videocassette.

Another object of Applicant's invention is to provide an enhanced videocassette recorder (VCR) system which, by incorporating a variety of record, playback, and videotape storage features, allows commercial free viewing as well as replay viewing during simultaneous recording and playback. Every program can now be viewed commercial free. The viewer may fastforward through an unwanted commercials. Sporting events may be viewed in a whole new manner with the viewer having total control over the creation and viewing of instant replays. The user, for example, may rewind, pause, or slow motion his favorite football play without interrupting the recording of the broadcasting program.

In addition, the present invention is an ideal "safety net" for viewing all programs. If the present invention is consistently used, the viewer will never miss parts of a broadcast program due to personal interruptions. If the viewer is interrupted during the program or needs to take a break from the program and cannot wait until a commercial appears, the viewer can, through Applicant's invention, simply hit the pause button, attend to the interruption and then begin viewing the program again without interrupting the recording and without missing any part of the transmitting broadcast program. The present invention enables the viewer near instant playback of the recording broadcast program through the VCR.

It is a further object of Applicant's invention to provide a low cost, mass-market single deck, duel taping system videocassette recorder unit which is easy to understand and use, adaptable with current and future circuitry, reliable and multi-functional, with a range of useful operations available for entertainment, educational and/or business purposes. The system of the present invention can be adapted to most VCRs manufactured today, as well as new developments currently in progress with minimal modifications and cost to the manufacturers. Because of the flexibility of the storage assembly's shape, the present invention can be custom designed to fit into almost any type of VCR system. Most of the standard VCR parts will not require modification thus minimizing manufacturing costs.

Further objects and advantages of the present invention will become apparent from the following description in light of the attached drawings.

DETAILED DESCRIPTION OF THE PREFERRED EMBODIMENT

Figure 1:
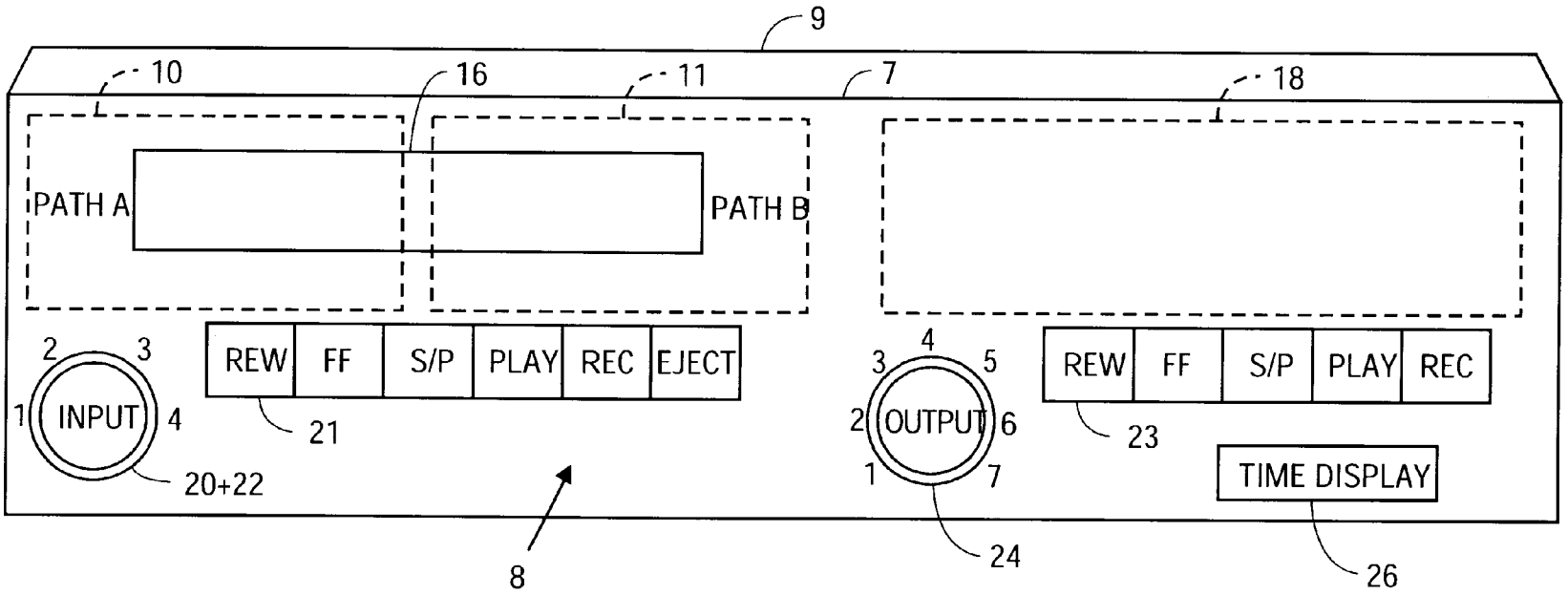
FIG. 1 is a front view of the control panel and housing of a single deck dual tape path VCR system utilizing features of the present invention, according to a preferred embodiment thereof.

Referring now to the drawings and particularly to FIG. 1, the housing (7) and front panel (8) of a single deck dual tape path videocassette system (9) providing broadcast recording and playback control and utilizing playback features hereinafter described is shown. System (9) is contained within a single housing (7) and, as will be described, includes a dual tape path arrangement for receiving a conventional videocassette tape therein.

Tape path-A (10) and tape path-B (11) are connected to built in storage assembly (18) and single access port (16). "Tape path" as used herein comprises hubs, for engaging drive wheels of the videocassette, motor means for driving one or both hubs, motor controls and electromagnetic, electrostatic, and/or optical transducer heads for exchange of control signals and information with the videotape medium of the videocassette. Built-in storage assembly (18) and its connection to tape path-A (10) and tape path-B (11) are described in conjunction with FIG. 4. Control panel (21) is used to control tape path-A (10), specifically for recording/playing-back a videocassette tape located-in access port (16). Thus, control panel (21) enables the user of the present invention to rewind, fast forward, stop, pause, play, record, and eject a videocassette tape located in access port (16). In turn, control panel (23) is used to control tape path-B (11), specifically for recording/playing-back video tape located in storage assembly (1). Likewise, control panel (23) enables the user of the present invention to rewind, fast forward, stop, pause, play and record video tape located in storage assembly (18).

Control panels (21) and (23) may be operated simultaneously. LCD time display (26) and optical sensors (not shown) in conjunction with a standard microprocessor well known in the art determine which functions on control panel (21) can operate simultaneously with the functions on control panel (23) by keeping track of the location of the video tape in path-A (10) and path-B (11) and the amount of tape, if any, in storage assembly (18). For example, the fast forward, playback and record functions of control panel (23) will only operate if there is video tape in storage assembly (18) and will automatically stop operating once storage assembly (18) is empty.

Input selection switches (20) and (22) are located on the front of housing (7) below port (16). Input selection switch (20) is provided for selecting the input signal line from which a program will be recorded onto a blank videocassette tape that has been inserted into access port (16). Input selection switch (22) is provided for selecting the input signal line from which a program will be recorded onto video tape in storage assembly (18). Output selection switch (24) is located on the front of housing (7) below and to the right of port (16) and, as will be described, selects a signal line which will be connected to the video monitor (not shown) for viewing. Input selection switches (20) and (22), output selection switch (24), and other VCR functions, i.e., play, record, rewind, fast forward, could also be operated from a remote control device (not shown).

Figure 2:
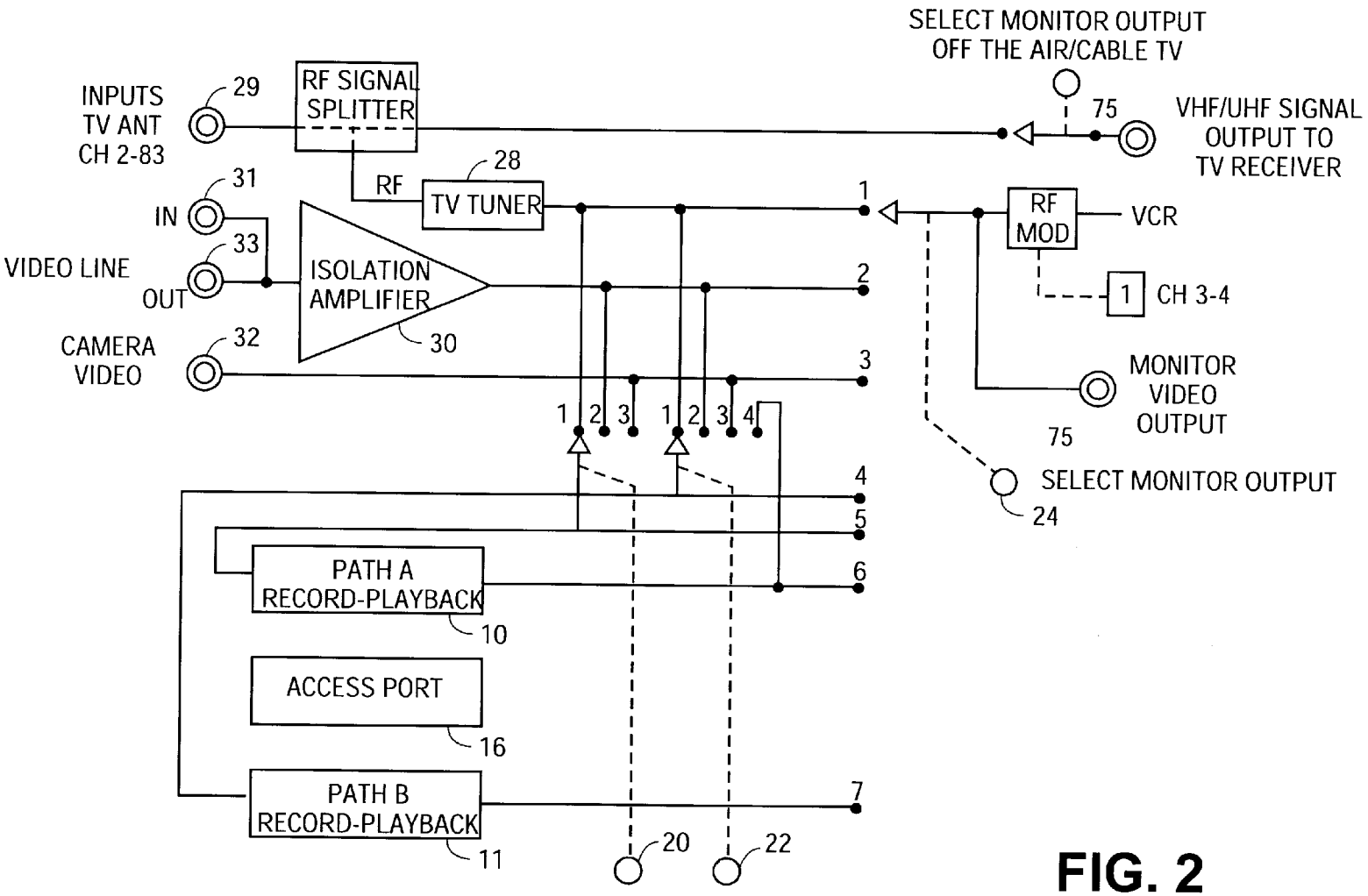
FIG. 2 is a circuit block diagram of a dual tape path VCR system of the present invention which can be associated with the FIG. 1 control panel and housing.

Referring now to FIG. 2, the single deck dual tape path videocassette system (9) (shown in FIG. 1) according to the preferred embodiment therefor is schematically illustrated and in this connection it is understood that the electrical components, as illustrated in block diagram form, are composed of conventional circuitry well known in the art except as otherwise specified herein. As shown in FIG. 2, electrical inputs into system (9) (shown in FIG. 1) include a TV antenna signal or cable TV input (29) that is directed through TV tuner (28), video input (31) that is directed through isolation amplifier (30), and camera video input (32). Port (16) provides video cassette tape access to path-A (10) and path-B (11), both of which have VCR play and record capabilities. Switch positions 1–3 of selector switch (20) direct the signals from inputs (29), (31), and (32) into VCR tape path-A (10). Therefore, position #1 on selector switch (20) directs the signal from the TV tuner (28) into path-A (10). Position #2 on switch (20) directs the signal from isolation amplifier (30) into path-A (10), and switch position #3 directs the signal from camera video (32) into path-A (10). Selector switch (22) and switch positions 1–3 therefor are disposed in parallel relation with respect to switch (20) and the switch positions thereof and direct the signals from inputs (29), (31), and (32) into VCR tape path-B (11). Thus, the input signal from TV tuner (28) is directed to path-B (11) through switch position #1 on selection switch (22), while the signal from isolation amplifier (30) is directed to path-B (11) through switch position #2 on selection switch (22), and switch position #3 on selection switch (22) directs the signal from camera video (32) to path-B (11). In addition, the output of tape path-A (10) is directed to path-B (11) through witch position #4 on selection switch (22). Thus, a broadcast program recorded through path-A (10) can be played back, before the completion of the transmitting broadcast, through path-B (11) by moving selection switch (22) to position #4.

The input signals may also be directed to TV monitor (not shown) for video display thereon. For this purpose, output selection switch (24) through the switch positions 1–7 thereof is moved to the appropriate position for selecting the desired signal among the seven outputs for connection to the TV monitor. As shown in FIG. 2, TV tuner (28) is connected directly to the TV monitor through switch position #1 on selection switch (24). A video line through isolation amplifier (30) is also connected to the TV monitor through switch position #2 of selection switch (24). If the videocassette tape located in access port (16) has been prerecorded, and it is desired to view this tape information on the TV monitor, selection switch (24) is moved to switch position #6. If the video tape located in storage assembly (18) (shown in FIG. 1) has been prerecorded, and it is desired to view this tape information on the TV monitor, selection switch (24) is moved to switch position #7.

The combination of input selection switches (20) and (22) and output selection switch (24) enables a versatility of operations that was not available in the previously known single and dual deck VCR systems of the prior art. The operations available through the combinations of input selection switches (20) and (22) and by output selection switch (24) are illustrated below:

| SWITCHES | | | |
|---|---|---|---|
| 20 | 22 | 24 | CAPABILITIES |
| | | | To record a transmitting broadcast program through path-A onto videocassette tape located in access port. |
| 2 | | | To dub a recorded program located in another VCR through path-A onto videocassette tape located in access port. |
| 3 | | | To record a camera video signal through path-A onto videocassette tape located in access port. |
| | 1 | | To record a transmitting broadcast program through path-B onto video tape located in storage assembly |
| | 2 | | To dub a recorded program located in another VCR through path-B onto video tape located in storage assembly. |

-continued

| SWITCHES | | | |
|---|---|---|---|
| 20 | 22 | 24 | CAPABILITIES |
| 3 | | | To record a camera video signal through path-B onto video tape located in storage assembly. |
| 1 | 1 | | To record a transmitting broadcast program through path-A onto videocassette tape located in access port while recording another transmitting broadcast program through path_B onto video tape located in storage assembly. |
| 1 | 2 | | To record a transmitting broadcast program thought path-A onto videocassette tape located in access port while dubbing a recorded program located in another VCR through path-B onto video tape located in storage assembly. |
| 1 | 3 | | To record a transmitting broadcast program through path-A onto videocassette tape located in access port while recording a camera video signal through path-B onto video tape located in storage assembly. |
| 2 | 1 | | To dub a recorded program located in another VCR through path-A onto port while recording a transmitting broadcast program through path-B onto video tape located in storage assembly. |
| 2 | 3 | | To dub a recorded program located in another VCR through path-A onto videocassette tape located in access port while recording a camera video signal through path-B onto video tape located in storage assembly. |
| 3 | 1 | | To record a camera video signal through path-A onto videocassette tape located in access port while recording a transmitting broadcast program through path-B onto video tape located in storage assembly. |
| 3 | 2 | | To record a camera video signal through path-A onto videocassette tape located in access port while dubbing a recorded program located in another VCR through path-B onto video tape located in storage assembly. |
| | | 1 | To watch a transmitting broadcast program on a TV monitor. |
| 1 | | 1 | To watch a transmitting broadcast program on a TC monitor while recording a transmitting broadcast program through path-A onto videocassette tape located in access port. |
| 2 | | 1 | To watch a transmitting broadcast program on a TV monitor while dubbing a recorded program located in another VCR through path-A onto videocassette tape located in access port |
| 3 | | 1 | To watch a transmitting broadcast program on a TV monitor while recording a camera video signal through path-A onto videocassette tape located in access port. |
| | 1 | 1 | To watch a transmitting broadcast program on a TV monitor while recording a transmitting broadcast program through path-B onto video tape located in storage assembly. |
| | 2 | 1 | To watch a transmitting broadcast program on a TV monitor while dubbing a recorded program located in another VCR through path-B onto video tape located in storage assembly. |
| | 3 | 1 | To watch a transmitting broadcast program on a TV monitor while recording |

-continued

| SWITCHES 20 | 22 | 24 | CAPABILITIES |
|---|---|---|---|
| | | | a camera video signal through path-B onto video tape located in storage. |
| | 1 | 2 | To watch a recorded program from another VCR through a vide lone on a TV monitor while recording a transmitting broadcast program through path-B onto video tape located in storage assembly. |
| | 2 | 2 | To watch a recorded program from another VCR through a video line on a TV monitor while recording a camera video signal through path-B onto video tape located in storage assembly. |
| 1 | 1 | 2 | To watch a recorded program from another VCR through a video line on a TV monitor while recording a transmitting broadcast program through path-A onto videocassette tape located in access port and while recording another transmitting broadcast program through path-B onto video tape located in storage assembly. |
| 1 | 2 | 2 | To watch a recorded program from another VCR through a video line on a TV monitor while recording a transmitting broadcast program through path-A onto videocassette tape located in access port and while dubbing a recorded program located in another VCR through path-B onto video tape located in storage assembly. |
| 1 | 3 | 2 | To watch a recorded program from another VCR through a video line on a TV monitor while recording a transmitting broadcast program through path-A onto videocassette tape located in access port and while recording a camera video signal through path-B onto video tape located in storage assembly. |
| 2 | 1 | 2 | To watch a recorded program from another VCR through a video line on a TC monitor while dubbing a recorded program located in another VCR through path-A onto videocassette tape located in access port and while recording a transmitting broadcast program through path-B onto video tape located in storage assembly. |
| 2 | 3 | 2 | To watch a recorded program from another VCR through a video line on a TV monitor while dubbing a recorded program located in another VCR through path-A onto videocassette tape located in access port and while recording a camera video signal onto video tape located in storage assembly. |
| 3 | 1 | 2 | To watch a recorded program from another VCR through a video line on a TV monitor while recording a camera video signal through path-A onto videocassette tape located in access port and while recording a transmitting broadcast program through path-B onto video tape located in Storage assembly. |
| 3 | 2 | 2 | To watch a recorded program from another VCR through a video line on a TV monitor while recording a camera video signal through path-A onto videocassette tape located in access port and while dubbing a recorded program located in another VCR through path-B onto video tape located in storage assembly. |
| | | 3 | To watch a camera video signal on a TV |
| 1 | | 3 | To watch a camera video signal on a TV monitor while recording a transmitting broadcast program through path-A onto |

-continued

| SWITCHES 20 | 22 | 24 | CAPABILITIES |
|---|---|---|---|
| | | | videocassette tape located in access port. |
| 2 | | 3 | To watch a camera video signal on a TV monitor while dubbing a recorded program located in another VCR through path-A onto videocassette tape located in access port. |
| 3 | | 3 | To watch a camera video signal on a TV monitor while recording a camera video signal through path-A onto videocassette tape located in access port. |
| | 1 | 3 | To watch a camera video signal on a TV monitor while recording a transmitting broadcast program through path-B onto video tape located in storage assembly. |
| | 2 | 3 | To watch a camera video signal on a TV monitor while dubbing a recorded program located in another VCR through path-B onto video tape located in storage assembly. |
| | 3 | 3 | To watch a camera video signal on a TV monitor while recording a camera video signal through path-B onto video tape located in storage assembly. |
| 1 | 1 | 3 | To watch a camera video signal on a TV monitor while recording a transmitting broadcast program through path-A onto videocassette tape located in access port and while recording another transmitting broadcast program through path-B onto video tape located in storage assembly. |
| 1 | 2 | 3 | To watch a camera video signal on a TV monitor while recording a transmitting broadcast program through path-A onto videocassette tape located in access port and while dubbing a recorded program located in another VCR through path-B onto video tape located in storage assembly. |
| 1 | 3 | 3 | To watch a camera video signal on a TV monitor while recording a transmitting broadcast program through path-A onto videocassette tape located in access port and while recording a camera video signal through path-B onto video tape located in storage assembly. |
| 2 | 1 | 3 | To watch a camera video signal on a TV monitor while dubbing a recorded program located in another VCR through path-A onto videocassette tape located in access port and while recording a transmitting broadcast program through path-B onto video tape located in storage assembly. |
| 2 | 3 | 3 | To watch a camera video signal on a TV monitor while dubbing a recorded program located in another VCR through path-A onto videocassette tape located in access port and while recording a camera video signal through path-B onto video tape located in storage assembly. |
| 3 | 1 | 3 | To watch a camera vide signal on a TV monitor while recording a camera video signal onto videocassette tape located in access port and while recording a transmitting broadcast program through path-B onto video tape located in storage assembly. |
| 3 | 2 | 3 | To watch a camera video signal on a TV monitor while recording a camera video signal through path-A onto videocassette tape located in access port and while dubbing a recorded program located in |

-continued

| SWITCHES | | | |
|---|---|---|---|
| 20 | 22 | 24 | CAPABILITIES |
| | | | another VCR through path-B onto video tape located in storage assembly. |
| | | 6 | To watch/playback on a TV monitor a recorded program located in videocassette tape that is inserted in access port. |
| | 1 | 6 | To watch/playback on a TV monitor a recorded program located in videocassette tape that is inserted in access port while recording a transmitting broadcast program through path-B onto video tape located in storage assembly. |
| | 2 | 6 | To watch/playback on a TV monitor a recorded program located in videocassette tape that is inserted in access port while dubbing a recorded program located in another VCR through path-B onto video tape located in storage assembly. |
| | 3 | 6 | To watch/playback on a TV monitor a recorded program located in videocassette tape that is inserted in access port while recording a camera video signal through path-B onto video tape locate in storage assembly. |
| 1 | | 7 | TV watch/playback on a TV monitor a recorded program located on video tape that is in storage assembly while recording a transmitting broadcast program through path-A onto videocassette tape located in access port. |
| 2 | | 7 | To watch/playback on a TV monitor a recorded program located on video tape that is in storage assembly while dubbing a recorded program located in another VCR through path-A onto videocassette tape located in access port. |
| 3 | | 7 | To watch/playback on a TV monitor a recorded program located on video tape that is in storage assembly while recording a camera video signal onto videocassette tape located in access port. |
| 1 | 4 | 7 | To record a transmitting broadcast program onto videocassette tape located in access port while playing back the same videocassette tape on a TV monitor |
| 3 | 4 | 7 | To record a camera video signal onto videocassette tape located in access port while playing back the same videocassette tape on a monitor. |

By utilizing the single deck dual tape path VCR system of the present invention, it is now possible by use of selection switches (20) and (22) to record a TV program through TV tuner (28) that is connected to switch position #1 of selection switch (20), while at the same time playing back the recording program on a TV monitor from tape path-B (11) through switch position #4 of selection switch (22) by activating record function on control panel (21) (shown in FIG. 1) and the play function on control panel (23) (shown in FIG. 1) and movement of output switch (24) to position #7.

Referring once again to FIG. 1, the system (9) can also be used for simultaneously recording from a broadcast or auxiliary input to the video tapes in both tape path-A (10) and tape path-B (11). This is accomplished by feeding enough blank tape into storage assembly (18) while maintaining adequate blank tape on the videocassette for the recording of the two desired programs.

Figure 3:
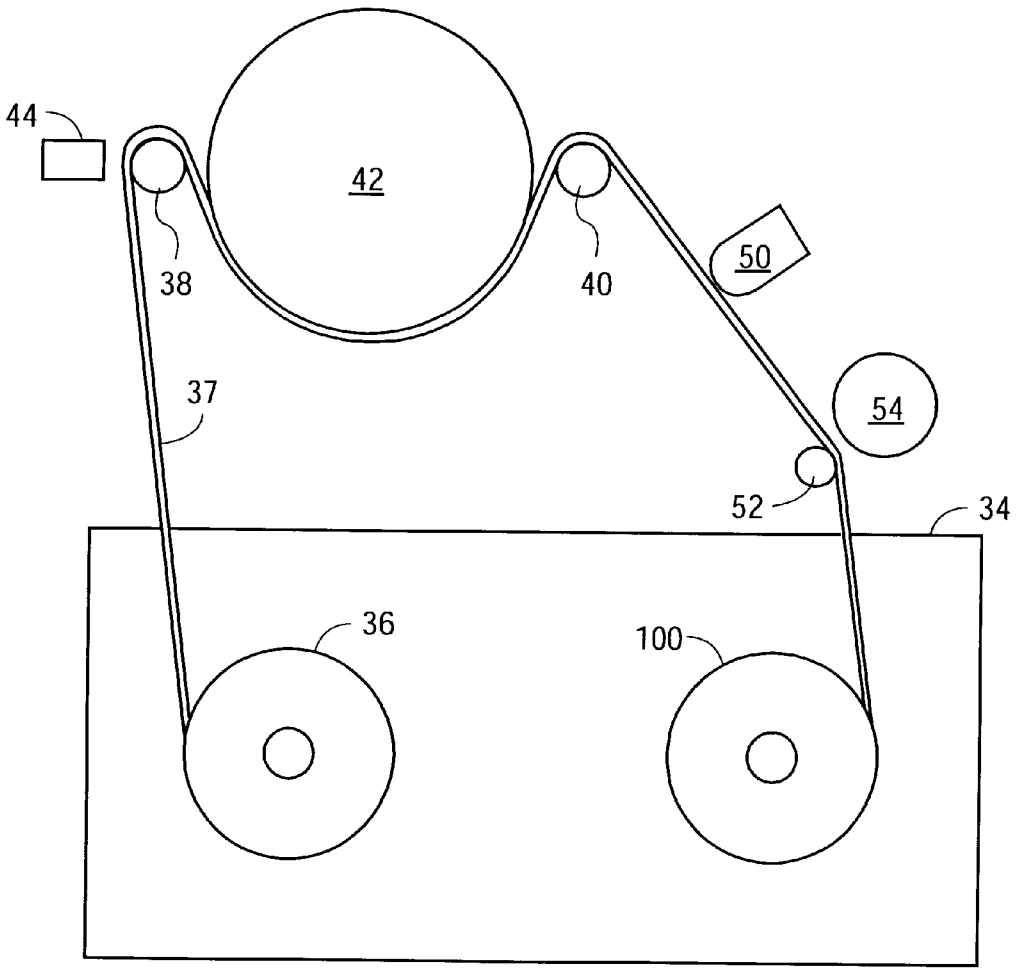
FIG. 3 (PRIOR ART)
FIG. 3 is a diagram of a standard tape path of VCR systems well known in the art.

Referring now to FIG. 3, a typical prior art path taken by tape (37) as it moves from supply reel table assembly (36) located in video cassette (34) to take-up reel table assembly (100) located in video cassette (34) is illustrated. Tape (37) is extracted from cassette (34) and passes supply tension regulator arm assembly (38) and (40). Supply tension regulator arm assembly (38) and (40) changes the forward direction of tape (37) toward drum (42). Tape (37) then passes full-width erase head (44). Tape (37) runs approximately 180 degrees around drum (42) where rotary video heads (not shown) make contact with it during record and playback. Tape (37), having passed drum (42), passes ACE (Audio, CTL and Erase) head (50). Tape (37) is squeezed between capstan assembly (52) and pinch roller assembly (54). Capstan assembly (52) rotates at a constant speed, advancing tape (37) at a fixed rate into take-up reel (100) located in cassette (34). The present invention utilizes this basic standard tape path arrangement with minor modifications when combining tape path-A (10) (shown in FIG. 1) with a second tape path, tape path-B (11) (shown in FIG. 1).

Figure 4:
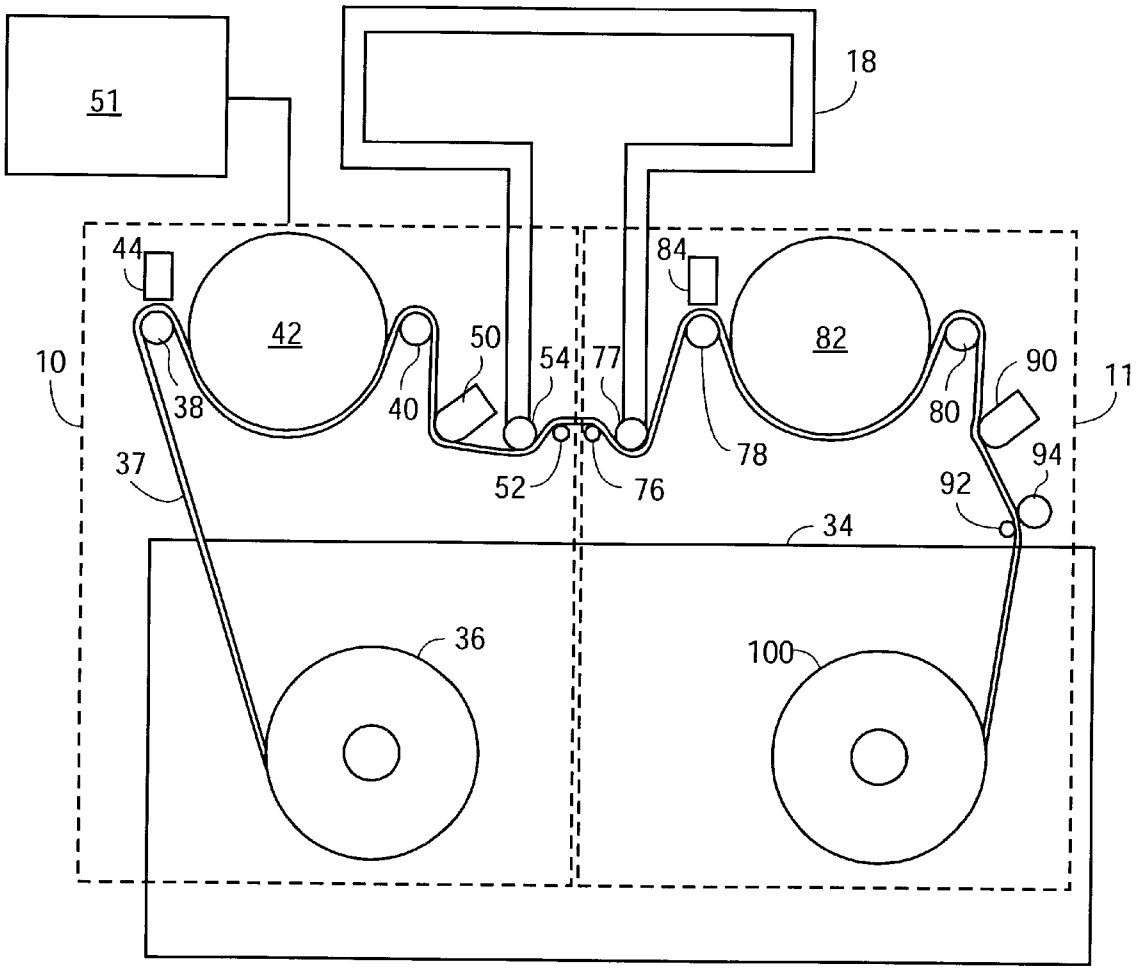
FIG. 4 is a detailed view of the dual tape path of the present invention which can be associated with the FIG. 1 control panel and housing.
Figure 5:
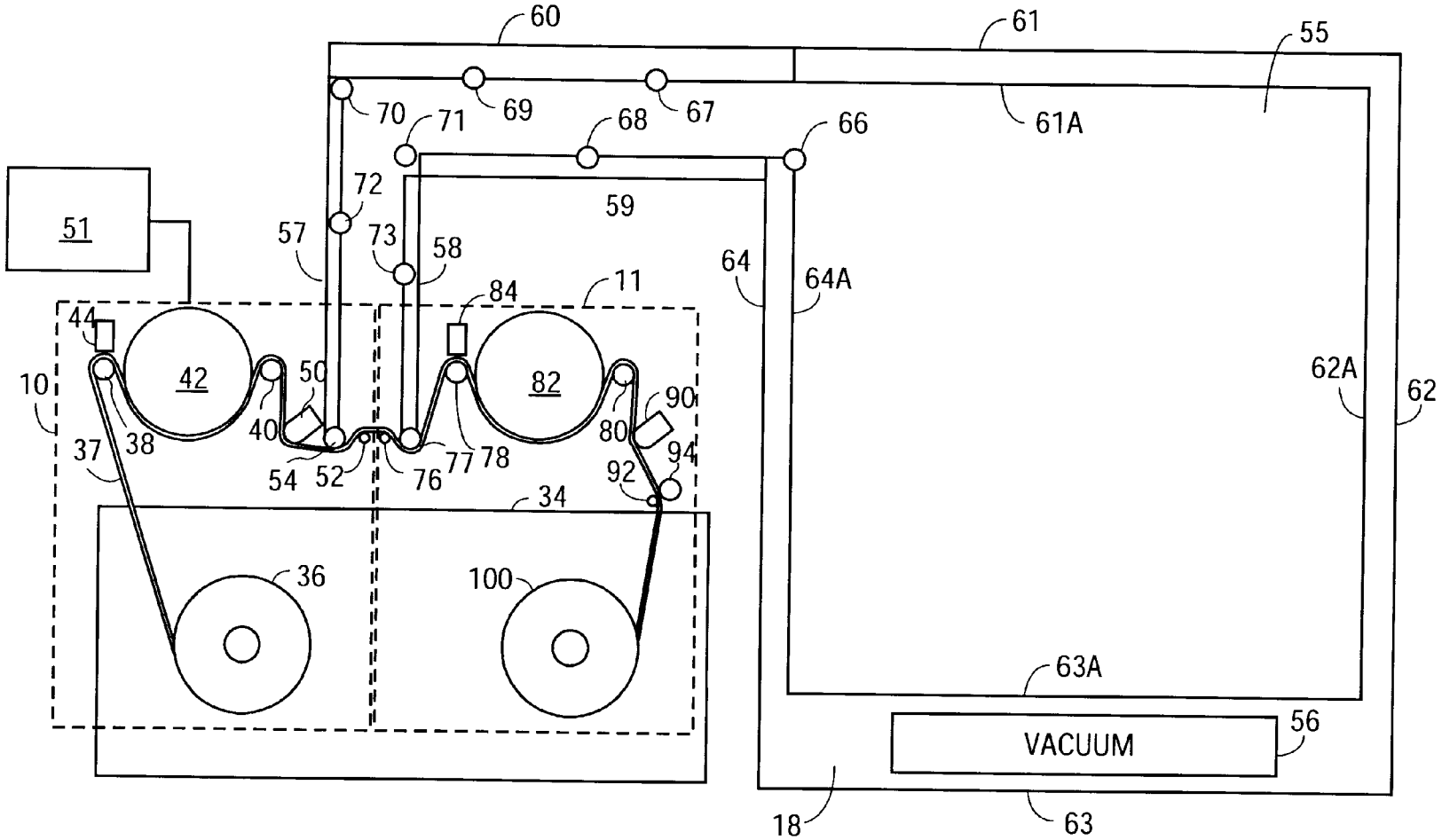
FIG. 5 is a diagram of the dual tape path and storage assembly of the preferred embodiment of the present invention which can be associated with the FIG. 1 control panel and housing.

FIG. 4 is a diagrammatic plan view of Applicant's invention. It is understood that the mechanical components illustrated in FIG. 4 and in FIG. 5 are composed of conventional mechanical components well known in the art except as otherwise specified herein. It is further understood that the electrical components in FIGS. 4 and 5 are composed of conventional circuitry well known in the art except as otherwise specified herein. According to the present invention, tape path-A (10) and tape path-B (11) are identical to one another, except where noted, and are connected by means of built-in storage assembly device (18), which will be described in detail later.

Tape path-A (10), tape path-B (11) and storage assembly (18) are contained in single housing VCR unit (7) (shown in FIG. 1). Video tape (37), by way of tape path-A (10), moves from supply reel table assembly (36) located in video cassette (34) to storage assembly (18).

Tape (37) is extracted out of cassette (34) and passes supply tension regulator arm assembly (38) and (40) of tape path-A (10). Supply tension regulator arm assembly (38) and (40) changes the forward direction of tape (37) toward drum (42). Tape (37) then passes full-width erase head (44). Tape (37) runs approximately 180 degrees around drum (42) where rotary video heads (not shown) make contact with it during record and playback. Tape (37), having passed drum (42), passes ACE (Audio, CTL and Erase) head (50). Tape (37) is squeezed between capstan assembly (54) and pinch roller assembly (52). Capstan assembly (54) rotates at a constant speed, advancing tape (37) at a fixed rate through Path-A (10) and into storage assembly (18). If desired, a standard prior art tape path could be followed, tape (37) bypassing storage assembly (18) being directly fed into take-up reel (100) located in cassette (34) by way of capstan assembly (92) and pinch roller assembly (94).

Video tape (37) by way of tape path-B (11) moves from storage assembly (18) to take-up reel table assembly (100) located in videocassette (34). Specifically, tape (37) is extracted from storage assembly (18), and is passed between capstan assembly (77) and pinch roller (76) to supply tension regulator arm assembly (78) and (80) of tape path-B (11). Supply tension regulator arm assembly (78) and (80) change the forward direction of tape (37) toward drum (82). Tape (37) then passes full-width erase head (84). Tape (37) runs approximately 180 degrees around drum (82) where rotary video heads (not shown) make contact with it during record and playback. Tape (37), having passed drum (82), passes ACE (Audio, CTL and Erase) head (90). Tape (37) is squeezed between capstan assembly (92) and pinch roller assembly (94). Capstan assembly (92) rotates at a constant speed, advancing tape (37) at a fixed rate out of storage assembly (18), through path-B (11), and into take-up reel (100) located in cassette (34).

Capstan assembly (54) and pinch roller (52) feed tape (37) through tape path-A (10) into and out of storage assembly (18) and cassette (34), Capstan assembly (77) and pinch roller (76) draw tape (37) through path-B (11), into storage assembly (18) and cassette (34), while capstan assembly (92) and pinch roller (94) draw tape (37) through path-B (11) out of storage assembly (18) and into cassette (34). Capstan assemblies (54) and (92) direct tape (37) through a tape path during record/playback at a constant fixed speed thus enabling the recording of a program through Path-A (10) and the play back of the same recorded program through Path-B (11).

Since the standard tape path is only slightly modified, prior art threading techniques can be utilized in the present invention and therefore is not described in detail herein. The following patents are illustrative of tape threading and guiding arrangements that could be adapted to the present invention: U.S. Pat. Nos. 5,164,868, issued Nov. 17, 1992, to Mosher et al.; and 5,144,505, issued Sep. 1, 1992, to Kaneko et al.

FIG. 5 is a diagrammatic plan view of the preferred embodiment of the present invention. Storage assembly (18) consists of floor (55), ceiling (not shown), and surrounding walls (57), (58), (59), (60), (61), (62), (63), and (64). The height of storage assembly (18), the distance between floor (55) and the ceiling of storage assembly (18), is slightly greater than the width of tape (37) preventing tape damage and tape entanglement. The size of storage assembly (18) enables two hours of video tape (recorded at EP speed) to be stored. When digital videocassette recording becomes standardized and available to the general public, the size of storage assembly (18) could be reduced in half since digital videocassette tape will be half the length and width as standard videocassette tape.

Once tape (37) is fed in storage assembly (18), by capstan assembly (54) and/or capstan assembly (77), optical sensors (not shown) operating in conjunction with a microprocessor (51) activate vacuum system (56). Vacuum systems such as that utilized in Applicant's invention are well known in the art and are thus not disclosed in detail here.

Vacuum system (56) draws air through perforated walls (61a), (62a), (63a), and (64a) causing tape (37) to be drawn against perforated walls (61a), (62a), (63a), and (64a). The perforations in walls (61a), (62a), (63a), and (64a) are a fraction above and below the edges of the width of tape (37), thus preventing tape (37) from blocking vacuum system (56). As tape (37) forms slack in storage assembly (18), vacuum system (56) draws tape (37), in a controlled random manner, towards walls (61a), (62a), (63a), and (64a) thus effectively utilizing storage space. Roller guides (66), (68), (71) and (73) constantly rotate in a clockwise direction, while roller guides (67), (69), (70), and (72) constantly rotate in a counter clockwise direction, preventing tape (37) from prematurely storing between walls (57), (58), (59), and (60). Vacuum system (56) is deactivated by means of sensors (not shown) operating in conjunction with a microprocessor once all of tape (37) is extracted from storage assembly (18).

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

I claim:

1. A VCR system for near simultaneous multifunction operations of at least one broadcast or cable communicated television signal, comprising:

(a) means for receiving a videocassette, for extracting videotape therefrom, and for returning the videotape thereto;

(b) means for receiving the at least one broadcast or cable communicated television signal;

(c) first tape path assembly for performing any of a first set of functions including recording the at least one broadcast or cable communicated television signal on a portion of the videotape extracted from the videocassette, playing back a prerecorded signal from a portion of the videotape extracted from the videocassette; and rewinding, pausing, and fast forwarding a portion of the videotape extracted from the videocassette;

(d) videotape storage compartment defined by walls forming an enclosure suitable for receiving and storing a quantity of the videotape extracted from the videocassette after performing any of the first set of functions in the first tape path;

(e) means for storing a portion of the videotape extracted from the videocassette in the videotape storage compartment;

(f) means for extracting a portion of the videotape stored in the videotape storage compartment; and (g) second tape path assembly for performing any of a second set of functions including recording a second broadcast or cable communicated television signal on a portion of the videotape extracted from the videotape storage compartment; playing back the first or second television signal from a portion of the videotape extracted from the videotape storage compartment; and rewinding, pausing, and fast forwarding a portion of the videotape extracted from the videotape storage compartment at substantially the same time that the first tape path assembly is performing any one of the first set of functions.

2. The VCR system of claim 1, wherein the videotape storage compartment comprises:

(a) tape feed channel, having means for transferring the videotape from the first tape path assembly into a tape storage enclosure and means for transferring the videotape between the second tape path and the tape storage enclosure, (b) the tape storage enclosure having a first dimension approximately equal to a width of the videotape.

3. The VCR system of claim 1, wherein the videotape storage compartment further comprises a vacuum system, wherein the vacuum system draws the extracted videotape into the videotape storage compartment in random fashion.

4. The VCR system of claim 3, wherein the videotape storage compartment comprises:

(a) tape feed channel, having means for transferring the videotape from the first tape path assembly into a tape storage enclosure and having means for transferring the videotape between the second tape path and the tape storage enclosure;

(b) the tape storage enclosure having a first dimension approximately equal to a width of the videotape, the tape storage enclosure being disposed in communication with the tape feed channel and having at least one wall through which a vacuum may be drawn; and (c) vacuum enclosure, disposed in communication with the tape storage enclosure through the wall, wherein the vacuum system draws air from the tape storage enclosure thereby drawing the videotape from the tape feed channel into the tape storage enclosure, and wherein the vacuum system permits removal of the videotape from the tape storage enclosure through the tape feed channel to the second tape path.

5. The VCR system of claim 1 further comprising a microprocessor for controlling the first tape path assembly, the second tape path assembly, and the videotape storage compartment, the microprocessor being adapted to determine a quantity of videotape passed through the first and second tape paths and adapted to compare the quantity of videotape passed through the first and second tape paths to determine a quantity of the videotape stored in the videotape storage compartment.

6. A method for near simultaneous recording and multifunction operations of a first broadcast or cable communicated television signal by a VCR system having a videotape storage compartment defined by walls forming an enclosure suitable for receiving and storing a quantity of extracted videotape, comprising the steps of:

(a) receiving a videocassette into the VCR system;

(b) extracting videotape from the videocassette into the VCR system;

(c) receiving the first television signal;

(d) recording the first television signal on a portion of the videotape extracted from the videocassette by way of a first tape path assembly within the VCR system;

(e) storing a quantity of the extracted and recorded videotape in the videotape storage compartment;

(f) extracting a quantity of the portion of the videotape stored in the videotape storage compartment into a second path assembly;

(g) performing any of a set of functions including recording a second broadcast or cable communicated television signal on a portion of the quantity of the videotape extracted from the videotape storage compartment; playing back the first or second television signal from a portion of the quantity of the videotape extracted from the videotape storage compartment; and rewinding, pausing, and fast forwarding a portion of the quantity of the videotape extracted from the videotape storage compartment by way of the second tape path assembly at substantially the same time that the first tape path assembly is recording the first television signal; and (h) returning the videotape from the second tape path assembly to the videocassette, wherein a time delay, controlled by a user of the VCR system through control of the step of performing any of the set of functions of the videotape, occurs between the step of storing the videotape and the step of performing any of the set of functions of the videotape.

7. The method of claim [7] *6* further comprising [the steps of]:

[(a)] rewinding the extracted and recorded videotape from the videocassette through the second tape path and into the tape storage compartment;

[(b)] replaying the first or second television signal from the rewound videotape in the tape storage compartment by way of the second tape path assembly; and

[(c)] returning the replayed videotape from the second tape path assembly to the videocassette, wherein [the step of] recording the first or second television signal by way of the first tape path and [the step of] storing the extracted and recorded videotape in the tape storage compartment may occur substantially simultaneous to [the step of] rewinding the extracted and recorded videotape through the second tape path and may progress independently thereof.

8. The method of claim [7] *6*, further comprising [the steps of]:

[(a)] fast forwarding the extracted and recorded videotape from the tape storage compartment, through the second tape path, to the videocassette;

[(b)] resuming play of the extracted and recorded videotape from the tape storage compartment, through the second tape path, to the videocassette, wherein [the step of] recording the first or second television signal by way of the first tape path and [the step of] storing the extracted and recorded videotape in the tape storage compartment may occur substantially simultaneous to [the step of] fast forwarding the extracted and recorded videotape from the tape storage compartment through the second tape path and may progress independently thereof.

*9. A method for near simultaneous recording and multifunction operations of video signal by a recording system comprising:*

*viewing and recording a first video signal on a recording media; and*

*simultaneously with viewing and recording the first video signal, recording a second video signal on the recording media.*

*10. The method of claim 9, wherein the first video signal comprises a broadcast television signal.*

*11. The method of claim 9, wherein the first video signal comprises a cable communicated television signal.*

*12. The method of claim 9, wherein the second video signal comprises a broadcast television signal.*

*13. The method of claim 9, wherein the second video signal comprises a cable communicated television signal.*

*14. The method of claim 9, wherein the recording media comprises a tape media.*

*15. The method of claim 9, wherein the recording media comprises a removable recording media.*

*16. The method of claim 9, wherein the first video signal is recorded to a first portion of the recording media, and the second video signal is recorded to a second portion of the recording media.*

*17. A method for providing pass through or capture of continuous streams of information in various formats while providing the appearance of a locally stored stream, comprising:*

*providing at least one media cache for copying blocks of data from the continuous streams of information, wherein data in said media cache can be viewed as a snapshot of said continuous streams of information; and*

*providing a playback pointer, wherein a playback pointer position selects a portion of said media cache that is to be accessed to provide functions including any of pause, rewind, fast forward, play, play faster, play slower, and play in reverse.*

*18. An apparatus to near simultaneous record and to perform multifunction operations of video signal comprising:*

*to view and to record a first video signal on a recording media; and*

*to simultaneously with viewing and recording the first video signal, to record a second video signal on the recording media.*

*19. The apparatus of claim 18, wherein the first video signal comprises a broadcast television signal.*

*20. The apparatus of claim 18, wherein the first video signal comprises a cable communicated television signal.*

*21. The apparatus of claim 18, wherein the second video signal comprises a broadcast television signal.*

*22. The apparatus of claim 18, wherein the second video signal comprises a cable communicated television signal.*

*23. The apparatus of claim 18, wherein the recording media comprises a tape media.*

*24. The apparatus of claim 18, wherein the recording media comprises a removable recording media.*

*25. The apparatus of claim 18, wherein the first video signal is recorded to a first portion of the recording media, and the second video signal is recorded to a second portion of the recording media.*

*26. An apparatus to provide pass through or capture of continuous streams of information in various formats while providing the appearance of a locally stored stream comprising:*

*a media cache for copying blocks of data from the continuous streams of information, wherein data in said media cache can be viewed as a snapshot of said continuous streams of information, and*

*a playback pointer, wherein the playback pointer position selects a portion of said media cache that is to be accessed to provide functions including any of pause, rewind, fast forward, play, play faster, play slower, and play in reverse.*

* * * * *